Aug. 23, 1960

H. P. LUHN 2,950,048

COMPUTER FOR VERIFYING NUMBERS

Filed Jan. 6, 1954

INVENTOR.
HANS P. LUHN
BY
Kenyon & Kenyon
ATTORNEYS

Aug. 23, 1960

H. P. LUHN 2,950,048

COMPUTER FOR VERIFYING NUMBERS

Filed Jan. 6, 1954

INVENTOR.
HANS P. LUHN

BY

*Kenyon & Kenyon*

ATTORNEYS

Aug. 23, 1960     H. P. LUHN     2,950,048
COMPUTER FOR VERIFYING NUMBERS

Filed Jan. 6, 1954     3 Sheets-Sheet 3

INVENTOR.
HANS P. LUHN
BY
Kenyon & Kenyon
ATTORNEYS

United States Patent Office 2,950,048
Patented Aug. 23, 1960

2,950,048

COMPUTER FOR VERIFYING NUMBERS

Hans P. Luhn, Armonk, N.Y., assignor to International Business Machines Corporation, New York, N.Y., a corporation of New York Filed Jan. 6, 1954, Ser. No. 402,491

5 Claims. (Cl. 235—61)

This invention relates to a hand computer for computing a check digit for numbers or for verifying numbers which already have a check digit appended.

The principal object of the invention is to provide a simple, inexpensive and portable computer for computing check digits and to provide a simple device for verifying numbers which have a check digit appended.

A further object of the invention is to provide apparatus for computing, in a fast and simple manner, check digits to append to the numbers or to verify numbers with check digits attached.

Pursuant to the invention, a visual check is provided for use at the time of verification. Stamping means is also preferably provided for recording the verified number and for preserving the visual check, which may be appended to the number.

The apparatus of my invention is used in a checking system for multi-digit numbers to indicate whether, in transmitting a number, an error has been made, such as a transposition of the digits. It may be used, for example, where a great many parts are ordered, manufactured, invoiced, shipped, and billed by multi-digit numbers. When a number is first assigned to a new part a check digit is computed, as will be explained hereinafter, and this check digit is appended to the righthand end of the part number. Thereafter whenever the correctness of that part number is in question the number can always be easily and quickly verified by my invention.

The particular mathematical system of number checking preferably embodied in my invention is one in which a single digit, called the check digit, is appended to the righthand end of the original or true number. The value of this check digit is so computed that in verifying the number by cross addition of the multiple digits of the number and the check digit, in accordance with a rule of substitution, the result will be a zero. This zero will appear as such on the computer. If the stamping or printing means of my device is utilized, a check mark may be used to indicate that the number is correct.

Specific illustrations of my invention are shown in the accompanying drawings illustrating two embodiments of the invention, and in which.

Figure 1:
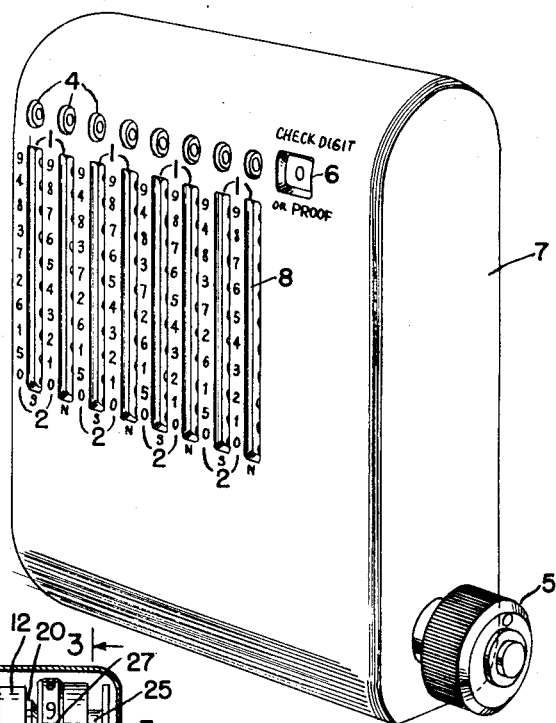
Figure 1 is a front perspective view of one of the said embodiments of my device.

For convenience of description, the operation of the apparatus of my invention, first in computing a check digit and secondly in verifying a number with a check digit appended, will be set forth to facilitate a complete understanding of the function and purpose of the apparatus. This will be followed by a description of the apparatus and its operation.

It is commonly known that in copying a number comprised of a plurality of digits it often happens that an error occurs by transposing two of the digits. This common error is detected by the invention herein described by the cross addition of digits, the alternate digits being replaced by "substitute" digits, prior to the cross addition. It should be understood that other systems of cross addition checking could be utilized but the system used herein is described as a practical example. In such a method of cross addition for checking a number, it is readily seen that the straight cross addition of the original digits of a number would fail to give any information concerning erroneous transposition because the sum would be the same regardless of the relative placement of the digits. However, if every other digit is a substitute digit in accordance with the system herein set forth, such an error will be detected.

The substitute digit equals twice the origianl digit plus an end around carry (an end around carry in this system means the addition of any digit standing in the tens position to the digit standing in the units position in the doubled number, as shown below). Thus the substitute digit for an original –3– is –6–(–2–×–3–=–6–). The substitute digit for an original –6–, illustrating the end around carry, is –3–(–2–×–6–=–12–=–1–+–2–=–3–).

The following table gives the substitute for each digit according to this system.

| Original   | –0– | –1– | –2– | –3– | –4– | –5– | –6– | –7– | –8– | –9– |
|---|---|---|---|---|---|---|---|---|---|---|
| Substitute | –0– | –2– | –4– | –6– | –8– | –1– | –3– | –5– | –7– | –9– |

Applying this system of substitute digits to determine the check digit for a number of seven digits (which is the number of digits provided for in the particluar embodiment of the invention hereinafter described), such as –4872148–, first a check digit will be determined, and secondly the number with the check digit appended will be verified. In accordance with the substitution system utilized in my invention, the first digit of the number reading from left to right is a substitute digit, the second digit is an original digit and then this order is repeated until all of the digits have been accounted for. The first digit of the example number, the original –4–, is replaced by its substitute digit, an –8–. This –8– is added to the next digit –8–, an original digit, resulting in the sum of –16– which becomes a –6– by casting out tens in the usual manner. The next digit is an original –7– which is replaced by its substitute digit, a –5–. This –5– is added to the –6– resulting in a –1–. This cross addition, if continued in accordance with the above, across the remaining four digits of the sample number would result in a sum of –6–. This can be determined from the following table giving the original and alternate substitute digits for the number in question.

Original _____ –4 8 7 2 1 4 8–
Alternate Substitute __ –8+8+5+2+2+4+7– = –6–

Once this sum of –6– has been computed the check digit to be appended is derived by adding to this sum its tens complement or in this case the digit –4–, this being the amount to be added to –6– to produce ten. If this –4– is added to the sum –6– as an original number, the total in the last column will be a –0–. The significance of this particular end result will become apparent in the explanation of the verification of a number having a check digit appended.

It should be realized that the check digit should be added in as an original number. This is accomplished by starting out by using either the original or the substitute digit for the first digit of the alternate substitute number depending on whether the number has an even or an odd number of digits, respectively. By following this rule it will be readily seen that the check digit will always be added in as an original number in that it always follows a substitute digit. This saves the step of substituting a substitute digit for the original check digit once this check digit has been ascertained and further simplifies the computing of this check digit by mechanical means as will be further shown hereinafter.

In practice this digit –4– is appended to the righthand end of the original number, resulting in an eight digit number –48721484–, with the –4– serving as a check digit. To verify this number the same procedure is followed step by step using the number with the check digit appended and if this number has been transmitted correctly the cross addition will result in a sum of –0–, indicating that the number is verified.

The above relatively complex step-by-step procedure is simplified and systematized by the apparatus comprising the present invention as will now be shown.

Having thus described the mathematical principle utilized, I shall now describe in detail the embodiment of my invention shown in the drawings.

Referring first to Figures 1 to 4, casing 7 is provided along its front face with a plurality of parallel slots 1. Adjacent each of these slots, the casing has imprinted thereon a column of digits 2, these digits being uniformly spaced from one another. The odd slots are substitute digit slots, for the reason apparent from the corresponding columns 2. The digits printed alongside of the substitute digit slots are the original digits. They are so arranged that the spacing from the bottom of the slot is a number of positions or units corresponding to the substitute digit. Therefore, the person using this embodiment may read an original number into odd slots 1 by reference to the printed indicia without having to go through the mental process of substituting digits by the use of the system described above, that is, the arrangement of the digits in the alternate columns mechanically provides for this alternate substitute digit step.

It should be further understood that the determination of whether the lefthand column of digits 2 will be substitute digit or original digit column depends on the number of digits in the entire number, it being desired that the last digit column on the righthand end be an original digit column so that the check digit to be appended can be appended in original form. It will be readily seen therefore that if the number which is to have a check digit appended consists of an odd number of digits then the lefthand column must be a substitute digit column and likewise if it is an even number of digits number the lefthand column must be a normal digit column.

Vertically above each slot is a circular aperture 4. Within the casing 7 are a plurality of narrow endless belts 8, one of the belts being aligned behind each of said slots 1 and the corresponding circular aperture 4. Extending along a portion of the length of each of the belts 8 is a plurality of uniformly spaced gripping means such as the circular apertures 3, each of said apertures 3 being adjacent one of the digits 2 when the apparatus is set to compute a number. Along another portion of the length of each of said belts 8, above the portion having the circular apertures 3 therein, are printed the uniformly spaced series 9 of digits from –0– to –9–, inclusive. These digits are arranged to be readable through the circular apertures 4 during the operation of the apparatus. Along still another portion of the length of each of said belts 8, below the apertures 3, are the uniformly spaced series of raised digits 10 from –0– to –9–, inclusive. These digits are adapted to extend through an aperture 11 extending perpendicular to said belts 8 in the base of the casing 7. At any one time there is only one raised digit 10 on each belt 8 extending through said aperture 11 and thus by pressing the base of this apparatus against an inked pad and stamping the inked raised digits 10 on a piece of paper the respective settings of the various belts 8 will be recorded. Likewise at any positioning of the holes by the stylus as above the same digits appear in the apertures 4 and in the base apertures 11.

The belts 8 are carried by an arched plate 12 (Figs. 3 and 4) arranged at the top of the casing 7 and supported by bracket 13 attached to a member 14 extending across the casing and attached to the sides thereof. The belts further pass over a plurality of pulleys 15 arranged adjacent the base of the casing 7, each of these pulleys being independently rotatable on a common shaft 16, the axis of said shaft being parallel to the base of said casing and to the axis of the arched plate 12.

The belts are preferably provided with projections 18' arranged to engage in notches in the periphery of the pulleys to keep the belts and pulleys in proper relationship.

A spring pawl 17 disposed adjacent each of said plurality of pulleys 15 has its free end arranged to engage in the transverse notches in the pulley to yieldably hold each of said pulleys against rotation.

Disposed inwardly of belts 8 and in spaced adjacent relation thereto is a single endless wide belt 18 having a plurality of parallel endless rows of uniformly spaced gripping means such as circular apertures 19, said rows being parallel to the side edges of said single belt. A row of apertures 19 is disposed behind and in register with the apertures 3 in each one of the plurality of belts 8. The centers of selected apertures 19 in the single belt 18 are thus in alignment with the centers of the apertures 3 in the belts 8 at all positions of rotation of the respective belts. The belt 18 passes over upper and lower pulleys 20 and 21. The upper pulley 20 is disposed inside the arched plate 12 with its periphery parallel thereto, and the lower pulley 21 is disposed above and adjacent the pulleys 15 with its axis parallel to the axis of said pulleys.

The apertures 3 in the belts 8 and the apertures 19 in the belt 18 are aligned as stated above to facilitate the placing of a pencil or stylus point through an aperture 3 in one of the plurality of belts 8 and an aperture 19 in the single belt 18 at the same time. Such a pencil or stylus when thus placed and moved is the motive force used to actuate the apparatus of my invention. More specifically, a pencil or stylus is placed in the aligned apertures opposite a digit in a digits column 2 and moved downwardly until the pencil or stylus comes to rest on the ledge at the base of each of said vertically extending slots 1. This movement of the pencil or stylus moves a single belt 8 of the plurality of belts to a new position and moves the single belt 18 to a new position. This movement of these belts repositions the digits 9 printed on the particular belt 8 so that a digit 9 corresponding to the digit indicated in column 2 for the opening in which the pencil was placed is adjacent and read through the circular aperture 4 in the casing. Likewise the same raised digit 10 is positioned in the aperture 11 at the base of the casing. Both of these positionings are thus indicative of the digit read into the apparatus with the pencil or stylus.

The movement of the inside single belt 18 serves to rotate the lower pulley 21. This pulley is connected by means of a belt 22 to a pulley 23 coaxial with the pulleys 15 and rotatable independently thereof. The pulley 23 is connected by means of a belt 24 to a rotatably independent master pulley 25 which is coaxial with pulley 20. Extending around the periphery of said pulley 23 are a plurality of raised blocks 26 adapted to extend one at a time through the aperture 11 in the base of the casing, one of said blocks having a raised check mark thereon. Extending around the periphery of the master pulley 25 is a digit wheel 27 having a plurality of digits in a series from –0– through –9– uniformly spaced thereon. Adjacent this plurality of digits, in the same side of the casing 7 as the plurality of slots 1, is a square aperture 6 through which one of the last named digits may be read. Thus when the single belt 18 is moved, the pulley 23 and the master pulley 25 are rotated by means of the interconnecting belts and the positioning of the single belt 18 is indicated by the digit read through said square aperture 6. At the time the digit –0– is read through said square aperture 6 the raised block 26 with the raised check mark (√) thereon extends through the aperture 11 in the base of the casing. Thus the visual –0– in aperture 6 is indicated by the stamping means at the base of the casing as a check mark for recording this positioning. When any other digit is read through the square aperture 6 a blank raised block 26 will extend through the aperture 11 in the base of the casing.

When the apparatus is set to the all zero position, that is when there is a –0– in each of the circular apertures 4, then there is also a –0– in the check digit aperture 6. As any digit is read into the apparatus from this setting the total displacement of the single inner belt 18 is directly translated by the above belt means to the master pulley 25. Thus the digit standing in the check digit aperture 6 represents this total displacement. More particularly, the digits from –0– to –9– are so arranged on the periphery of the digit wheel 27 on the master pulley 25 that the digit standing in the aperture 6 at any time will be the tens complement of the total of the original "units" that have been read into the apparatus. The digit indicated is the "tens complement," rather than the total of units, because the digits are arranged to pass aperture 6 in reverse order from –9– to –0–.

To further clarify this operation of the master pulley 25 and the check number read through the aperture 6, if the check digit standing in the aperture 6 is a –0– and an original –4– is read into an original column 2 the resultant check digit standing in the aperture 6 is a –6– (that is the tens complement of the –4–). On the other hand, if a –4– is read into a substitute digit column 2 at a time when the digit standing in the aperture 6 is a –0–, the resultant digit in the check digit aperture 6 will be a –2– which of course is not the tens complement of the –4–. This will be apaprent from Fig. 1 where the digit –4– in a substitute digit column is in the same horizontal line as the –8– in an original digit column. Thus the inner belt 18 will be moved –8– "units" for the –4– in the substitute digit column with a resultant tens complement of –2– standing in the check digit aperture 6.

It will be seen from reading the previous paragraph that it is important in verifying a number, to add the check digit in as an original digit rather than a substitute digit. Thus the previous statements that the column 2 should be arranged to provide that the last column where the check digit is appended be an original digit column. Thus to obtain a check digit –0– in the check digit aperture the digit standing in the check digit aperture 6 must be added in as an original digit, that is the inner belt 18 must be moved an original check number of "units." This may be done by insertion of a stylus in the belt apertures in the check digit position in the last original digit column and moving the stylus to the lowest position in the column.

Figure 2:
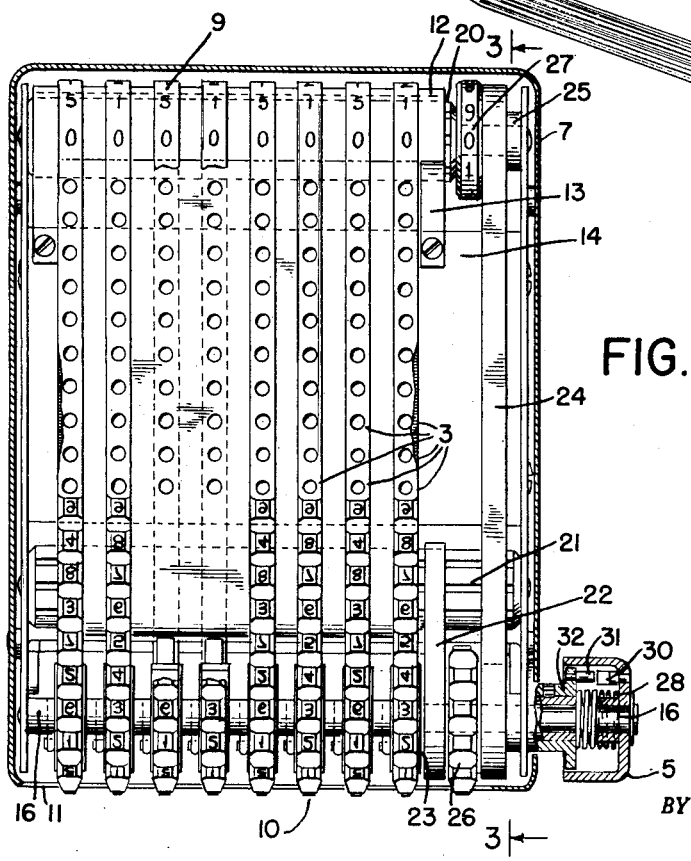
Figure 2 is a front elevation of one of the said embodiments partially in cross section.
Figures 3, 4:
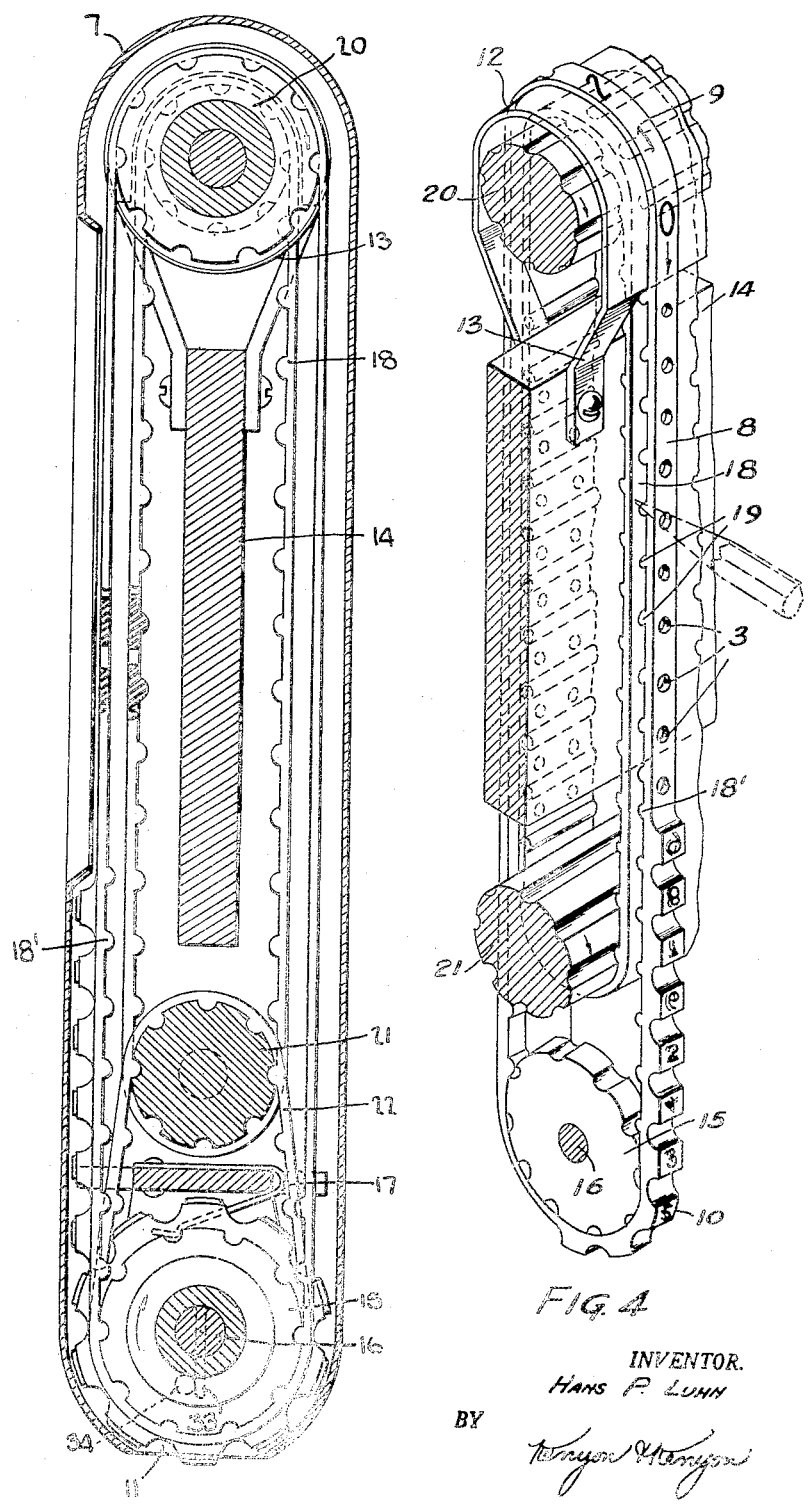
Figure 3 is a cross-section of one of the said embodiments on the line 3—3 in Figure 2.
Figure 4 is a perspective view of a portion of the same, partly in cross section.

A reset knob 5 disposed on one side of the casing 7 is normally yieldingly held in an outward position due to the resilient force of the spring 28. As shown in Figures 2 and 3, the knob 5 is slidably disposed on a shaft 16. Extending inwardly from said knob is a pin 30 which contacts a pin 31 attached to a housing 32 which is integrally attached to the shaft 16. The shaft 16 carries a plurality of pins 33, each arranged to contact a pin 34 projecting from one of the pulleys 15 and from the pulley 23, when the knob 5 is in its inner position. When the knob is in its outer disengaged position the pins 34 engage the pins 33 when the pulleys are rotated, thus rotating the shaft 16 but the knob remains stationary being so held by the resilient force of the spring 28. When the operator of my apparatus wishes to reset the belts and pulleys to the positions shown in Figure 1 this reset knob 5 is pressed axially inwardly and rotated in a clockwise direction. This rotation causes the pins 33 attached to the common shaft 16 to contact and move the pins 34 extending from the pulleys 15 and 23, so as to simultaneously position said pulleys at the defined reset position.

In operation, again using the number –4872148– as an illustration, the operator of the apparatus begins with the lefthand column of vertical digit columns 2 and places a stylus or other sharp pointed object in the gripping means such as the aperture belt 8 opposite the –4– corresponding to the first digit in the number –4872148– and in the corresponding hole in belt 18 and presses downwardly on the stylus until it is stopped opposite the figure –0– by the ledge at the bottom of the tape slot.

Next the stylus is placed in the aperture of the next rightward belt 8 opposite the –8– in the second vertical column 2 (–8– being the second digit in the example number), and in the corresponding opening in belt 18, and the stylus is pressed downwardly to the –0– position.

This column by column placement and movement of the stylus is continued across the columns from left to right until all seven digits have been accounted for. At the end of this process the seven digit number –4872148– will appear in the circular apertures 4 directly above the columns, and the check digit –4–, will be indicated in the box 6 marked "Check Digit or Proof" at the upper righthand corner. At this same time the raised type digits –4872148– will be positioned at the base of the apparatus for recording the number much like the ordinary rubber stamp used in conjunction with an inked stamp pad.

To verify this number the apparatus is returned to the all zero position (in each aperture 4), by means of the knob 5. This reset moves the belts 8 having the notations thereon and the stylus holes therein. After this return to the all zero position, the number –48721484–, that is the seven digit example number with the indicated check digit appended, is read into the apparatus by column-by-column positioning of the apertures 3 as before. At the end of the eight digit positioning the number indicated in the check digit box 6 in the upper righthand corner of the apparatus should be a –0–. That is, if it is a –0– the number is verified, if it is not a –0– some transposition of the digits has occurred in copying the number.

Further when the eight digit number is read into the apparatus and if the number is verified by the indication of a –0– in the check digit box, then at the same time a raised type check mark will be positioned at the base of the apparatus at the righthand end of the eight digit number. Thus the result of stamping this number will be a –48721484–√.

Figure 5:
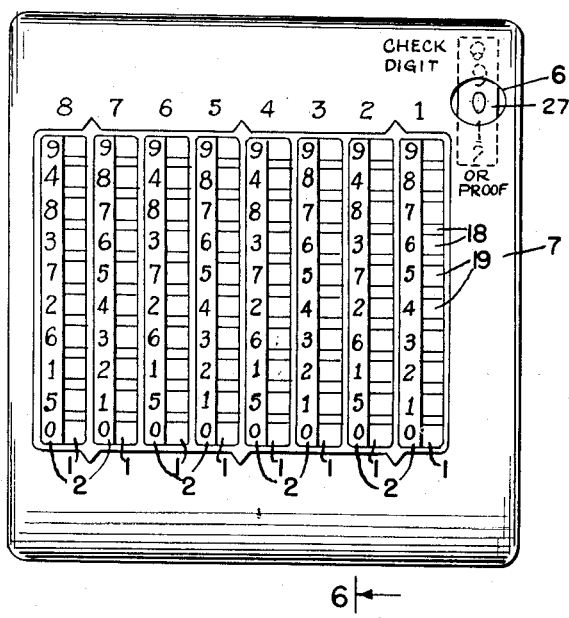
Figure 5 is a front elevation of another embodiment of my invention.
Figure 6:
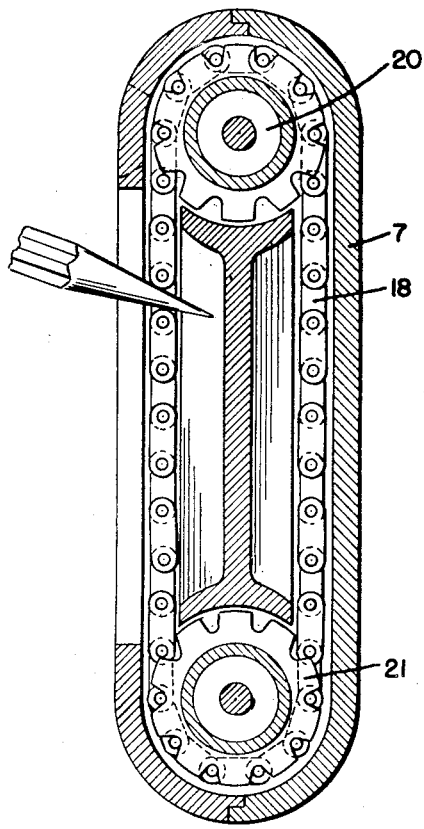
Figure 6 is a sectional view taken on the line 6—6 in Figure 5.

In the embodiment shown in Figures 5 and 6 the plurality of belts shown at 8 in Figures 1–4 have been omitted so that there is only the single wide belt 18 spanning two pulleys 20, 21, thus eliminating the visual check of the number read in and also eliminating the raised digits and blocks used in the embodiment described hereinbefore in conjunction with an inked pad as a stamping means. In the use of this embodiment the stylus is inserted in the proper apertures 19 of the belt 18 to move the belt in the same way as in Figures 1 through 4. The movement of the belt causes the digit wheel 27 to rotate (the digit wheel is coaxially attached to the pulley 20 in this embodiment, eliminating the more complex belt drive means described in connection with Figures 1 through 4). The rotation of the digit wheel 27 causes successive check digit indicia to be revealed through the aperture 6 in the same manner as in the previously described embodiment.

Many other modifications may be made without departing from the scope of the invention.

I claim:

1. Apparatus for cross addition of numbers having original and substitute digits in alternate orders comprising a member having a plurality of slots and a column of ten digit indicia adjacent each slot, a movable endless belt behind and common to all slots and having gripping means spaced to match the spacing of the digit indicia, an endless belt individual to each slot and having gripping means spaced to match the spacing of the digit indicia, the belts being movable longitudinally of the slots by inserting a stylus through a slot into engagement with a gripping means and moving the same along the slot, a digit wheel actuated by the first belt for summing up motions of the first belt, the digit wheel having ten digit indicia in numerical order spaced so that they advance one digit as the belt advances from one digit to another of the columns, said member having a viewing window above each slot and digit indicia on the individual belts arranged to indicate the digit indicia read into each slot, and digit printing indicia on the individual belts arranged to indicate the digit indicia read into each slot.

2. Apparatus as in claim 1 in which the columns of digit indicia for alternate slots are in numerical order beginning with –0– at one end of the slots, and the columns of digit indicia for intermediate slots are in the order of the substitute digits of columns of digit indicia for the alternate slots.

3. Apparatus as in claim 1 wherein digit indicia on the digit wheel are in numerical order so that said digits indicate the tens complement of the summation of the motions of the belt common to all slots.

4. Apparatus as in claim 2 having means for resetting the digit wheel and the belts individual to each slot to –0–.

5. Apparatus as in claim 2 having a viewing window for the indicia of the digit wheel and means for positioning a printing check mark adjacent the printing indicia when the digit wheel exhibits a predetermined check digit through its viewing window.

References Cited in the file of this patent

UNITED STATES PATENTS

| | | |
|---|---|---|
| 626,524 | Boehl | June 6, 1899 |
| 847,759 | Gangher et al. | Mar. 19, 1907 |
| 1,058,008 | Standley | Apr. 1, 1913 |
| 1,288,793 | Anderson | Dec. 24, 1918 |
| 1,422,944 | Edmondson | July 18, 1922 |
| 2,296,312 | Sheehy et al. | Sept. 22, 1942 |
| 2,370,735 | Keuper | Mar. 6, 1945 |
| 2,722,378 | Helmig et al. | Nov. 1, 1955 |
| 2,731,196 | Luhn | Jan. 17, 1956 |